US011950631B2

(12) United States Patent
Liu

(10) Patent No.: US 11,950,631 B2
(45) **Date of Patent: *Apr. 9, 2024**

(54) HIGH-FREQUENCY HEATING DEVICE

(71) Applicant: Shenzhen Eigate Technology Co., Ltd., Shenzhen (CN)

(72) Inventor: Tuanfang Liu, Shenzhen (CN)

(73) Assignee: ASPIRE NORTH AMERICA LLC

( * ) Notice: Subject to any disclaimer, the term of this patent is extended or adjusted under 35 U.S.C. 154(b) by 479 days.

This patent is subject to a terminal disclaimer.

(21) Appl. No.: 17/115,782

(22) Filed: Dec. 8, 2020

(65) Prior Publication Data

US 2022/0125115 A1 Apr. 28, 2022

(30) Foreign Application Priority Data

Oct. 25, 2020 (CN) ........................ 202022389620.2

(51) Int. Cl.

| | |
|---|---|
| ***A24F 40/465*** | (2020.01) |
| ***A24F 1/30*** | (2006.01) |
| ***A24F 40/50*** | (2020.01) |
| ***H05B 6/06*** | (2006.01) |

(52) U.S. Cl.
CPC .............. *A24F 40/465* (2020.01); *A24F 1/30* (2013.01); *A24F 40/50* (2020.01); *H05B 6/06* (2013.01)

(58) Field of Classification Search
None
See application file for complete search history.

(56) References Cited

U.S. PATENT DOCUMENTS

| | | | | |
|---|---|---|---|---|
| 4,682,610 | A * | 7/1987 | Freelain .................... | A24F 1/30<br>131/210 |
| 2013/0042865 | A1* | 2/2013 | Monsees ................. | A24F 40/51<br>128/203.27 |
| 2017/0251718 | A1* | 9/2017 | Armoush .................. | A24F 1/30 |
| 2017/0311648 | A1* | 11/2017 | Gill .......................... | A24F 40/42 |
| 2018/0020725 | A1* | 1/2018 | Alarcon .................. | A24F 40/50<br>131/329 |

* cited by examiner

*Primary Examiner* — Philip Y Louie
*Assistant Examiner* — Miles A Simpson
(74) *Attorney, Agent, or Firm* — MATTHIAS SCHOLL P.C.; Matthias Scholl

(57) ABSTRACT

A high-frequency heating device, includes: a housing, a thermal insulation cup, and a magnetic induction coil. The housing includes a cavity and the magnetic induction coil is disposed in the cavity. The thermal insulation cup is nested in the magnetic induction coil.

6 Claims, 4 Drawing Sheets

HIGH-FREQUENCY HEATING DEVICE

CROSS-REFERENCE TO RELATED APPLICATIONS

Pursuant to 35 U.S.C. § 119 and the Paris Convention Treaty, this application claims foreign priority to Chinese Patent Application No. 202022389620.2 filed on Oct. 25, 2020, the contents of which, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, MA 02142.

BACKGROUND

The disclosure relates to a high-frequency heating device.

Conventionally, when a high-frequency heating device is combined with a hookah for heating a tobacco material, the high-frequency heating device is held by hands to heat the tobacco material in the hookah. In addition, the conventional high-frequency heating device has no over-temperature protection function.

SUMMARY

The disclosure provides a high-frequency heating device, comprising: a housing, a thermal insulation cup, and a magnetic induction coil; the housing comprises a cavity and the magnetic induction coil is disposed in the cavity; the thermal insulation cup is nested in the magnetic induction coil.

In a class of this embodiment, the high-frequency heating device further comprises a variable-frequency power source and a battery; the variable-frequency power source and the battery are disposed in the housing; the battery comprises an output end soldered on an input end of the variable-frequency power source; an output end of the variable-frequency power source is soldered on the magnetic induction coil; in a power on state, the variable-frequency power source outputs an alternating current and thus the magnetic induction coil produces an induced magnetic field.

In a class of this embodiment, the high-frequency heating device further comprises a temperature difference sensor; the temperature difference sensor is soldered on the variable-frequency power source and is in the vicinity of a top opening of the thermal insulation cup to sense a temperature of an airflow entering the thermal insulation cup, thus controlling the variable-frequency power source whether or not to enter an automatic heating mode.

In a class of this embodiment, the high-frequency heating device further comprises a thermistor; the thermistor is soldered on the variable-frequency power source and is located in the thermal insulation cup for over-temperature protection; when a working temperature of the heating device reaches 600 degrees Fahrenheit, no current is output from the variable-frequency power source, and the heating device stops working.

In a class of this embodiment, the high-frequency heating device is combined with a hookah for heating a tobacco material; the hookah comprises a heating cup and a smoke filter; the heating cup is configured to accommodate the tobacco material; the heating cup communicates with the smoke filter; when in use, the heating cup is embedded in the cavity of the housing of the high-frequency heating device; and the heating cup comprises glass with a metal conductor inlaid in the glass.

In a class of this embodiment, the heating cup comprises a top end provided with an air inlet through which air enters the heating cup.

In a class of this embodiment, in the power on state, an eddy current is produced in the metal conductor in an induction magnetic field of the magnetic induction coil whereby the metal conductor is heated up, and then the heat is transferred to the heating cup through heat transfer to heat the tobacco material in the heating cup to produce smoke; in a smoking process, the air enters the heating cup via the air inlet, and the temperature difference sensor sensors a temperature change in the heating cup and controls the variable-frequency power source to work in an automatic heating mode; the smoke produced in the heating cup is driven by the air to enter the smoke filter where the smoke is filtered by water and then flows out of the exit of the smoke filter for user's inhaling.

DETAILED DESCRIPTION

To further illustrate, embodiments detailing a high-frequency heating device are described below. It should be noted that the following embodiments are intended to describe and not to limit the disclosure.

Principle of high frequency heating: when an alternating current is introduced to a magnetic induction coil, an alternating magnetic field will be generated. When a metal conductor is placed in the alternating magnetic field, an eddy current is produced. The eddy current makes the metal conductor heated.

Tobacco materials refer to tobacco tar, tobacco paste, tobacco leaf and other materials used to produce smoke.

Figure 1:
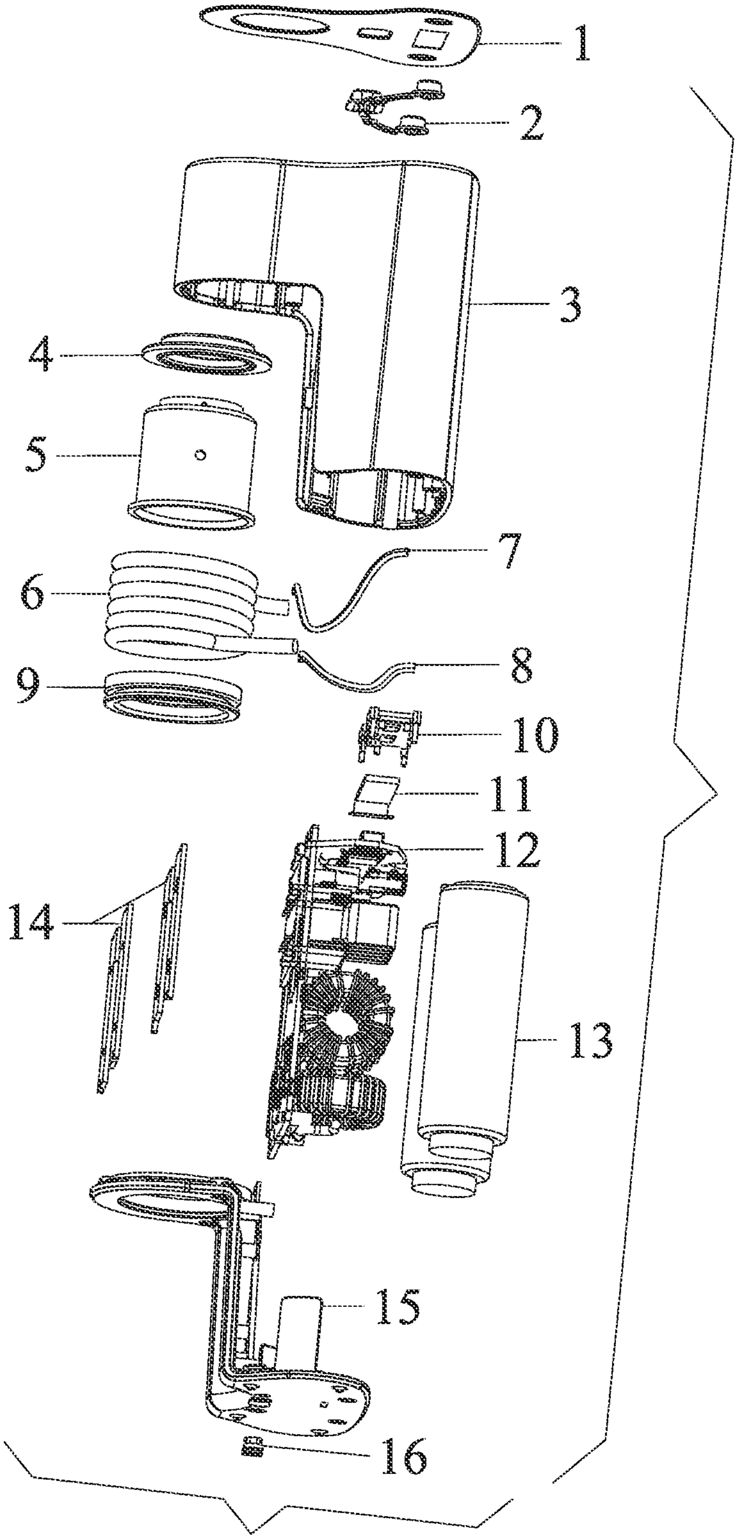
FIG. 1 is an exploded view of a high-frequency heating device in accordance with one embodiment of the disclosure.
Figure 2:
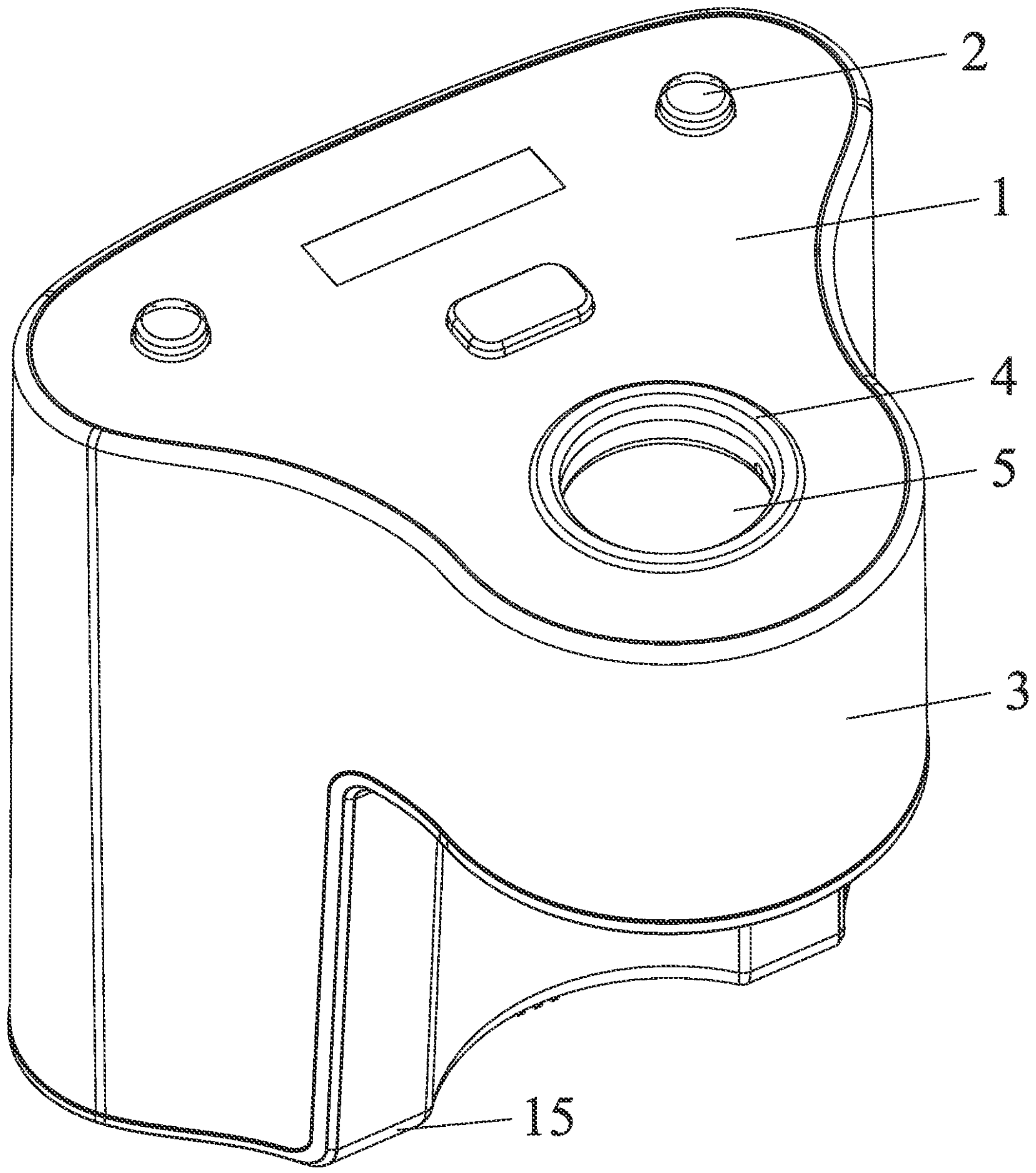
FIG. 2 is a schematic diagram of a high-frequency heating device in accordance with one embodiment of the disclosure.
Figure 3:
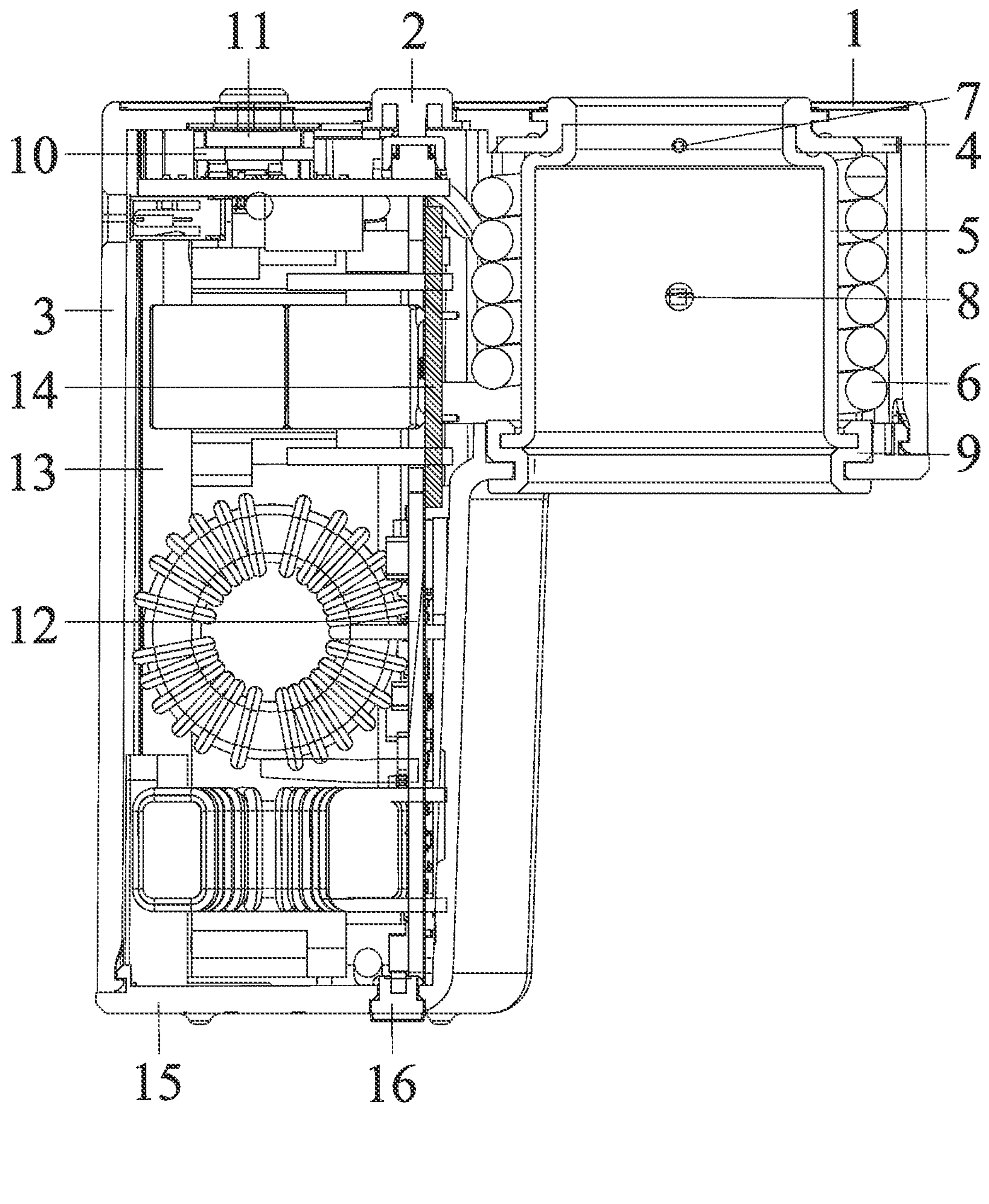
FIG. 3 is a sectional view of a high-frequency heating device in accordance with one embodiment of the disclosure.

As shown in FIGS. 1-3, the disclosure provides a high-frequency heating device, comprising an upper cover 1, a button 2, a housing 3, a first thermal insulator 4, a thermal insulation cup 5, a magnetic induction coil 6, a temperature difference sensor 7, a thermistor 8, a second thermal insulator 9, a support 10, a screen 11, a variable-frequency power source 12, a battery 13, a silica thermal conductor 14, a bottom cover 15, and a mode switch 16. The magnetic induction coil 6 is disposed in a cavity of the housing 3. The thermal insulation cup 5 is nested in the magnetic induction coil 6. The first thermal insulator 4 and the second thermal insulator 9 are disposed on two ends of the thermal insulation cup 5, respectively. The silica thermal conductor 14 is attached to the surface of the variable-frequency power source 12 for heat dissipation. The screen 11 is fixed on the support 10 and is soldered on the variable-frequency power source 12 to display functional information. The variable-frequency power source 12 and the battery 13 are disposed in the housing 3. The battery comprises an output end soldered on the input end of the variable-frequency power source 12. The output end of the variable-frequency power source 12 is soldered on the magnetic induction coil 6. In the power on state, the variable-frequency power source 12 outputs an alternating current and thus the magnetic induction coil 6 produces an induced magnetic field. The temperature difference sensor 7 is soldered on the variable-frequency power source 12 and is in the vicinity of the top opening of the thermal insulation cup 5 to sense the temperature of the airflow, thus controlling the variable-frequency power source 12 whether or not to enter an automatic heating mode. The thermistor 8 is soldered on the variable-frequency power source 12 and is located in the thermal insulation cup 5 for over-temperature protection. When the working temperature reaches 600 degrees Fahrenheit, no current is output from the variable-frequency power source 12, and the heating device stops working. The button 2 is disposed on the variable-frequency power source 12 for opening the power supply and regulating the output power. The upper cover 1 is fixed on the housing 3 and the button 2 is exposed out of on the surface of the upper cover. The bottom cover 15 is fixed on the bottom of the housing 3. The bottom cover 15 comprises a hole, and the mode switch 16 passes through the hole and is connected to a mode button of the variable-frequency power source 12. Turning the mode switch 16 can adjust the variable-frequency power source 12 to output different powers, so as to heat different types of smoke materials.

Figure 4:
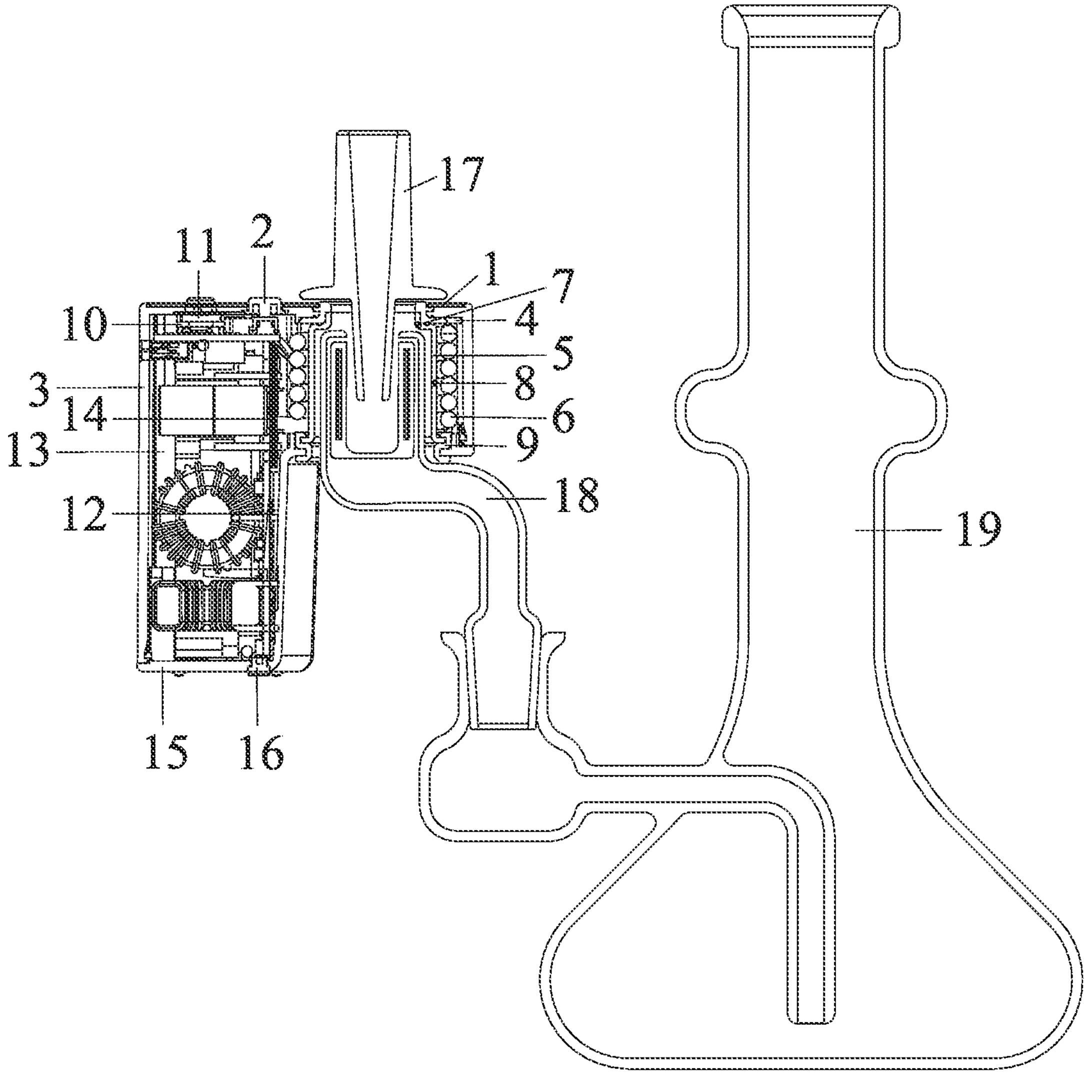
FIG. 4 shows a use of a high-frequency heating device in combination with a hookah in accordance with one embodiment of the disclosure.

As shown in FIG. 4, the high-frequency heating device is combined with a hookah for heating a tobacco material. The hookah comprises a heating cup 18 and a smoke filter 19. The heating cup is configured to accommodate the tobacco material. The heating cup communicates with the smoke filter 19. When in use, the heating cup 18 is embedded in the cavity of the housing of the high-frequency heating device. The heating cup 18 comprises a top end provided with an air inlet 17. The heating cup 18 comprises an inlaid metal conductor. In the power on state, an eddy current is produced in the metal conductor in the induction magnetic field of the magnetic induction coil 6 whereby the metal conductor is heated up, and then the heat is transferred to the heating cup 18 through heat transfer to heat the tobacco material in the heating cup 18 to produce smoke. In the smoking process, the air enters the heating cup 18 via the air inlet 17 and drives the smoke produced in the heating cup 18 to enter the smoke filter 19 where the smoke is filtered by water and then flows out of the exit of the smoke filter for user's inhaling. When the air enters the heating cup, the internal temperature of the heating cup 18 changes. The temperature difference sensor 7 sensors the temperature change and controls the variable-frequency power source 12 to work in an automatic heating mode. In the mode, no need to hold the button 2 manually, as long as the temperature difference sensor 7 sensors the temperature change, the variable-frequency power source 12 can work automatically.

The following advantages are associated with the high-frequency heating device of the disclosure:

1. When in use, the high-frequency heating device is directly fixed on a hookah to heat the tobacco material in the heating cup, without the aid of users' hands, which is convenient for users to operate;
2. In the smoking process, the temperature difference sensor sensors the temperature change in the heating cup and controls the variable-frequency power source to work in an automatic heating mode, no need to hold the button manually, improving the user experience.

It will be obvious to those skilled in the art that changes and modifications may be made, and therefore, the aim in the appended claims is to cover all such changes and modifications.

What is claimed is:

1. A hookah comprising a heating device, a heating cup for accommodating tobacco material, and a smoke filter; the heating device comprising a housing, a thermal insulation cup, a first thermal insulator, a second thermal insulator, and a magnetic induction coil; wherein:

the housing has an L shape in a cross section, and comprises a first arm, and a second arm;

the first arm comprises a first cavity, and the second arm comprises a second cavity;

the magnetic induction coil and the heating cup are disposed in the first cavity;

the thermal insulation cup is sleeved on the heating cup, and is disposed between the magnetic induction coil and the heating cup;

each of the first thermal insulator and the second thermal insulator comprises an annular surface;

the first thermal insulator and the second thermal insulator are disposed on two ends of the thermal insulation cup, respectively;

the heating cup comprises glass and a metal conductor inlaid in the glass; and the smoke filter is directly connected with the heating cup.

2. The hookah of claim 1, wherein the heating device further comprises a variable-frequency power source and a battery; wherein the variable-frequency power source and the battery are disposed in the second cavity; the battery comprises an output end soldered on an input end of the variable-frequency power source; an output end of the variable-frequency power source is soldered on the magnetic induction coil; in a power on state, the variable-frequency power source outputs an alternating current and thus the magnetic induction coil produces an induced magnetic field.

3. The hookah of claim 2, wherein the heating device further comprises a temperature difference sensor, wherein the temperature difference sensor is soldered on the variable-frequency power source and is in the vicinity of a top opening of the thermal insulation cup to sense a temperature of an airflow entering the thermal insulation cup, thus controlling the variable-frequency power source whether or not to enter an automatic heating mode.

4. The hookah of claim 3, wherein the heating device further comprises a thermistor, wherein the thermistor is soldered on the variable-frequency power source and is located in the thermal insulation cup for over-temperature protection; when a working temperature of the heating device reaches 600 degrees Fahrenheit, no current is output from the variable-frequency power source, and the heating device stops working.

5. The hookah of claim 3, wherein the heating cup comprises a top end provided with an air inlet through which air enters the heating cup.

6. The hookah of claim 5, wherein in the power on state, an eddy current is produced in the metal conductor in an induction magnetic field of the magnetic induction coil whereby the metal conductor is heated up, and then the heat is transferred to the heating cup through heat transfer to heat the tobacco material in the heating cup to produce smoke; in a smoking process, the air enters the heating cup via the air inlet, and the temperature difference sensor senses a temperature change in the heating cup and controls the variable-frequency power source to work in an automatic heating mode; the smoke produced in the heating cup is driven by the air to enter the smoke filter where the smoke is filtered by water and then flows out of an exit of the smoke filter for user's inhaling.

* * * * *